US011263873B1

(12) United States Patent
Le

(10) Patent No.: US 11,263,873 B1
(45) Date of Patent: Mar. 1, 2022

(54) CASINO WAGERING SYSTEM

(71) Applicant: Le Gaming LLC, Sacramento, CA (US)

(72) Inventor: Johnny Le, Sacramento, CA (US)

(73) Assignee: Le Gaming LLC, Sacramento, CA (US)

( * ) Notice: Subject to any disclaimer, the term of this patent is extended or adjusted under 35 U.S.C. 154(b) by 0 days.

(21) Appl. No.: 16/666,806

(22) Filed: Oct. 29, 2019

Related U.S. Application Data

(63) Continuation-in-part of application No. 15/415,859, filed on Jan. 25, 2017, now Pat. No. 10,490,030, which is a continuation-in-part of application No. 15/212,248, filed on Jul. 17, 2016, now abandoned.

(60) Provisional application No. 62/193,549, filed on Jul. 16, 2015.

(51) Int. Cl.
*G06F 17/00* (2019.01)
*G07F 17/32* (2006.01)

(52) U.S. Cl.
CPC ...... *G07F 17/3293* (2013.01); *G07F 17/3241* (2013.01); *G07F 17/3246* (2013.01)

(58) Field of Classification Search
None
See application file for complete search history.

(56) References Cited

U.S. PATENT DOCUMENTS

| | | | | |
|---|---|---|---|---|
| 6,702,289 | B1 * | 3/2004 | Feola | A63F 3/00157 273/274 |
| 6,811,153 | B1 * | 11/2004 | Ko | A63F 3/00157 273/274 |
| 7,325,806 | B1 * | 2/2008 | Feola | A63F 1/00 273/292 |
| 7,722,048 | B2 * | 5/2010 | Smith | A63F 1/00 273/292 |
| 2004/0066000 | A1 * | 4/2004 | Webb | A63F 3/00157 273/292 |
| 2005/0170875 | A1 * | 8/2005 | Snow | G07F 17/3262 463/13 |
| 2006/0025213 | A1 * | 2/2006 | Kane | G07C 15/005 463/29 |
| 2007/0066376 | A1 * | 3/2007 | Webb | G07F 17/32 463/13 |
| 2008/0207295 | A1 * | 8/2008 | Yoseloff | G07F 17/3276 463/13 |
| 2008/0252011 | A1 * | 10/2008 | Bickley | G07F 17/32 273/292 |
| 2009/0008877 | A1 * | 1/2009 | Smith | A63F 1/00 273/292 |
| 2009/0124313 | A1 * | 5/2009 | Nicely | G07F 17/3262 463/12 |
| 2010/0096807 | A1 * | 4/2010 | Twitchen | G07F 17/32 273/292 |
| 2011/0140361 | A1 * | 6/2011 | Lo | A63F 1/00 273/292 |
| 2011/0180995 | A1 * | 7/2011 | Smith | A63F 1/00 273/303 |
| 2011/0198809 | A1 * | 8/2011 | Sparago | A63F 3/00157 273/292 |

(Continued)

*Primary Examiner* — Paul A D'Agostino
(74) *Attorney, Agent, or Firm* — Muskin and Farmer LLC

(57) ABSTRACT

A system which can implement an electronic version of pai gow poker using an electronic gaming system, as well as a physical pai gow game played with physical cards on a physical table.

2 Claims, 4 Drawing Sheets

(56) References Cited

U.S. PATENT DOCUMENTS

| | | | | |
|---|---|---|---|---|
| 2012/0080844 | A1* | 4/2012 | Smith | A63F 1/00 273/292 |
| 2012/0108308 | A1* | 5/2012 | Hong | G07F 17/326 463/13 |
| 2013/0079084 | A1* | 3/2013 | Sparago | A63F 1/00 463/11 |

* cited by examiner

CASINO WAGERING SYSTEM

CROSS REFERENCE TO RELATED APPLICATIONS

This application is a continuation in part to U.S. application Ser. No. 15/415,859, which is a continuation in part to U.S. application Ser. No. 15/212,248 which claims benefit to U.S. provisional application 62/193,549. All three of these applications are incorporated by reference herein in their entireties.

BACKGROUND OF THE INVENTION

Field of the Invention

The present general inventive concept is directed to a method, apparatus, and computer readable storage medium directed to a casino wagering game which can be played electronically or physically.

SUMMARY OF THE INVENTION

It is an aspect of the present invention to provide an exciting casino wagering game.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
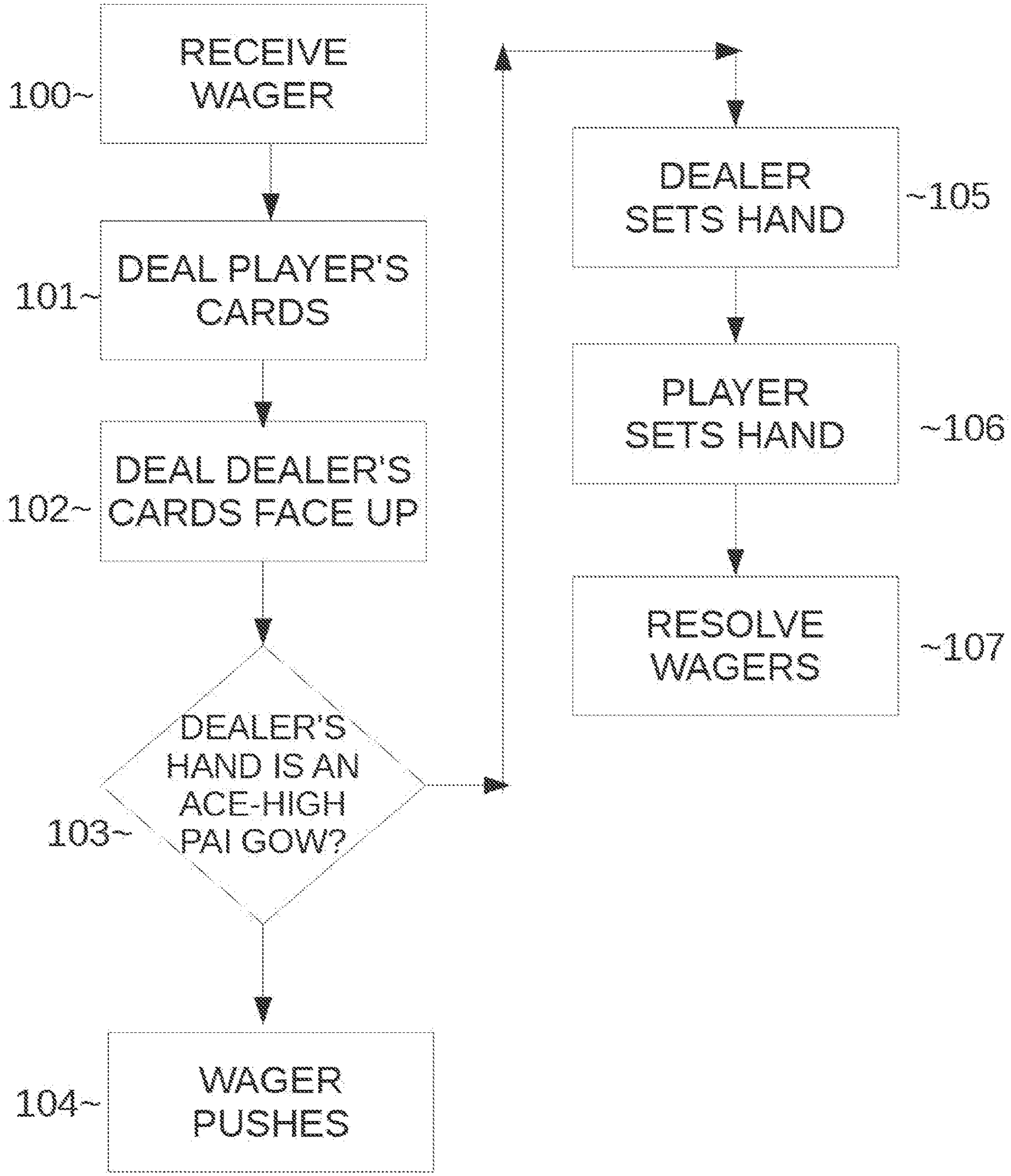
FIG. 1 is a flowchart illustrating an exemplary method of implementing a wagering game, according to an embodiment.

Reference will now be made in detail to the presently preferred embodiments of the invention, examples of which are illustrated in the accompanying drawings, wherein like reference numerals refer to like elements throughout.

The present inventive concept relates to a casino wagering game related to the known game of Pai Gow. Pai Gow is described in U.S. Pat. No. 8,371,918 which is incorporated by reference herein in its entirety. The known game of Pai Gow is generally played as follows. Each player makes a wager. Each player is then dealt seven cards and the dealer is dealt seven cards (face down at this point). The player sets his/her hand into two hands a five card "high" hand and a two card "low" hand. The five card hand must rank higher than the two card hand. Once all players have set their hands, then the dealer reveals his/her cards and sets his/her hand (makes a five card high hand and a two card low hand) using a house way. If both player's hands outrank (beat, rank higher) their respective dealer's hands (i.e., the player's five card hand beats the dealer's five card hand and the player's two card hand beats the dealer's two card hand) then the player wins even money on the wager. If both player's hand rank lower than their respective dealer's hands (i.e. the dealer's five card hand beats the player's five card hand and the dealer's two card hand beats the player's two card hand) then the player loses his/her wager. If neither of these conditions are met (e.g., only one of the player's hand beats its respective dealer's hand) then the wager pushes. In some casinos, the house (casino) will take a 5% commission on all player wins.

The present inventive concept is an improvement upon Pai Gow in which the game is played with a standard 52 card deck plus a joker in which the joker acts as a "bug" and can only be used (as a wild card) to complete a straight, flush, straight flush, or act as a suitless ace. Each player receives seven cards face down and the dealer receives seven cards face up. If the dealer's hand is an ace-high Pai Gow, then all player main wagers are pushed (alternatively, if the dealer's hand is any king-high or lower the player's wagers will push.) Once the dealer has set his/her hand, then the player sets his/her hand and play proceeds according to the standard game of Pai Gow (player banking is not offered). Players still pay a 5% commission on any winning hands and copy hands are a win for the house. A copy hand is an identical or tie hand. Thus, the players get to see the dealer's cards (and set hands) before the players set their own hands.

FIG. 1 is a flowchart illustrating an exemplary method of implementing a wagering game, according to an embodiment.

In operation 100, each player at the table makes a wager. This can be done as known in the art, wherein players place chips (directly redeemable for cash at a casino cashier) into a betting circle printed on a felt on the table.

From operation 100, the method proceeds to operation 101, wherein the dealer deals each player at the table seven cards. Typically, the cards are dealt face down to each player (although in another embodiment they can be dealt face up).

From operation 102, the method proceeds to operation 102, wherein the dealer deals the dealer's cards (typically seven) face up.

From operation 102, the method proceeds to operation 103, which determines whether the dealer's seven card hand is an ace high pai gow. This means if the seven card hand has a single ace but cannot make a better hand (e.g., no pair, three of a kind, straight, etc.) then it is an ace high pai gow. If the dealer's seven cards comprise an ace high pai gow, then the method proceeds to operation 104, wherein the wager pushes and the game ends.

If in operation 103, the condition is not met (the dealer's seven card hand is not an ace high pai gow), then the method proceeds to operation 105 wherein the dealer sets the dealer's hand according to a house way. Any house way can be used. All of the dealer's cards and hence the two dealer's hands are completely visible by all of the players.

From operation 105, the method proceeds to operation 106, wherein the player sets their hand (after having the benefit of seeing the dealer's set hands).

From operation 106, the method proceeds to operation 107, which resolves the wagers based upon a comparison of the player's five card hand and the dealer's five card hand, and a comparison of the player's two card hand and the dealer's two card hand. If the player's cards are still face down then they can be turned face up now. The wagers are resolved as illustrated in Table I (P stands for player, D stands for dealer, and ">" stands for "ranks higher than"). Standard poker and rankings are used in the comparison.

TABLE I

| P's 5 card hand > D's 5 card hand | P's 2 card hand > D's 2 card hand | outcome |
|---|---|---|
| Yes | Yes | player wins |
| No | No | player loses |
| Yes | No | player pushes |
| No | Yes | player pushes |

Figure 2:
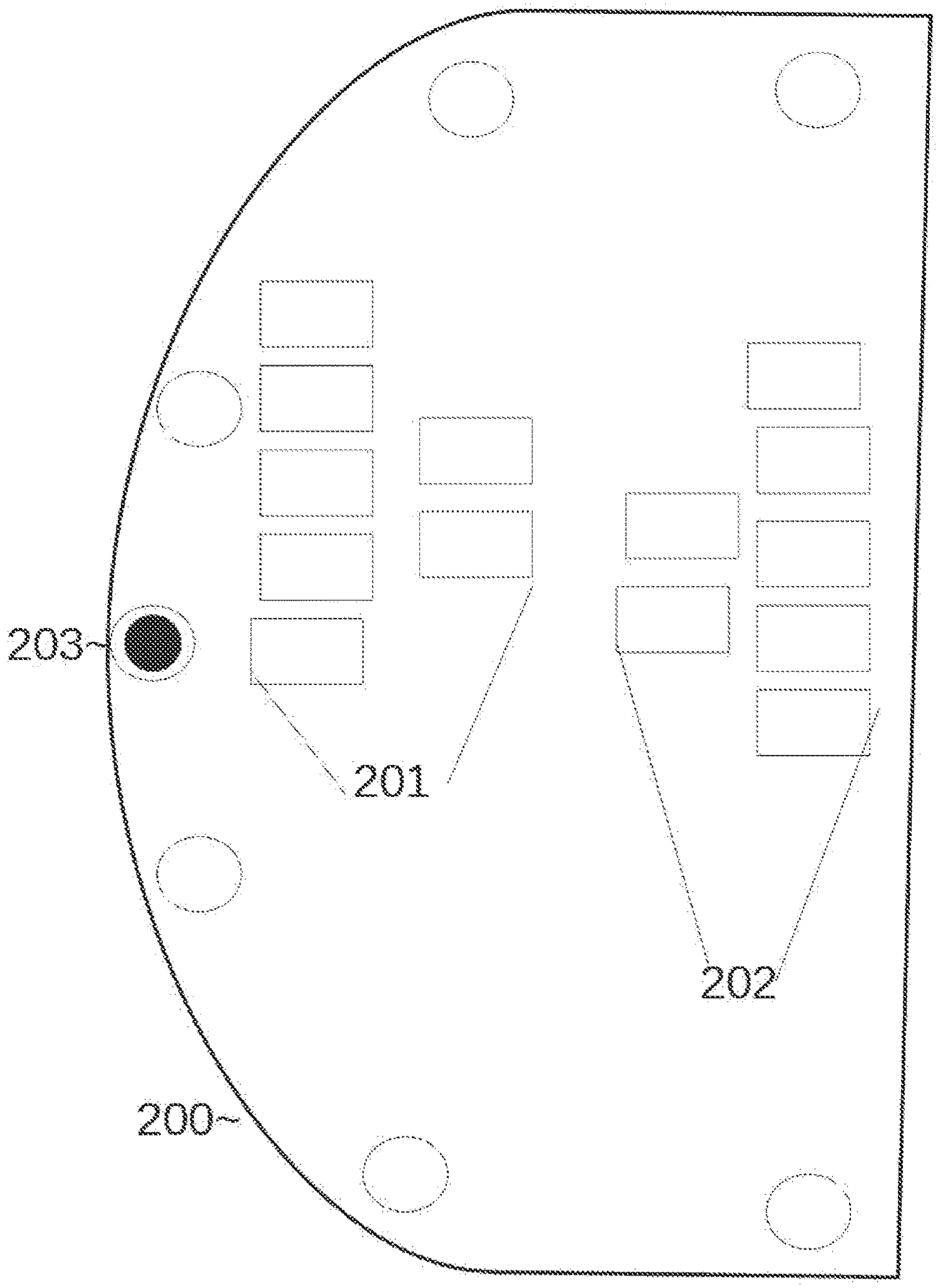
FIG. 2 is a drawing of a gaming table layout, according to an embodiment.

FIG. 2 is a drawing of a gaming table layout, according to an embodiment.

A gaming table 200 can accommodate seven simultaneous players (although other numbers of players can be accommodated). A player's hand 201 is set into a five card hand and a two card hand. A dealer's hand 202 is set into a five card hand and a two card hand. The player has made a wager 203 in his/her betting circle.

In a further embodiment, a no commission game can be offered with a side bet entitled "Ace High Push." In one embodiment, the side bet can be played optionally at the choice of the player. In another embodiment, the player must play the side bet (along with the main wager). Table II below illustrates another variation of the invention which has no commission and a side bet.

TABLE II

1. All the dealer cards are exposed first.
2. If the dealer has exactly an ACE-high hand "paigow", then the hand is an automatic push.
3. There is no player banking.
4. There is no commission on winning hands.
5. There is a side bet titled "Ace High Push" bonus side bet, see table III for the paytable.

Notably in this other variation there is no 5% commission on winning hands. Thus, when the player has a winning hand the player wins 100% of the payout. In other words if the player bet $100 and the player wins, then the player win $100 (not $95). This is different than the variation described previously, in which a commission was collected from the player on winning hands (e.g., 5%).

See Table III for the paytable on the "Ace High Push" side bet. The side bet is optional on the part of the player.

TABLE III

| Hand | Payout |
|---|---|
| Both player and dealer have Ace-High Paigow | 40 to 1 |
| Only dealer has Joker Ace-High Paigow | 15 to 1 |
| Only dealer has no Joker Ace-High Paigow | 5 to 1 |
| All others | lose |

Figure 3A:
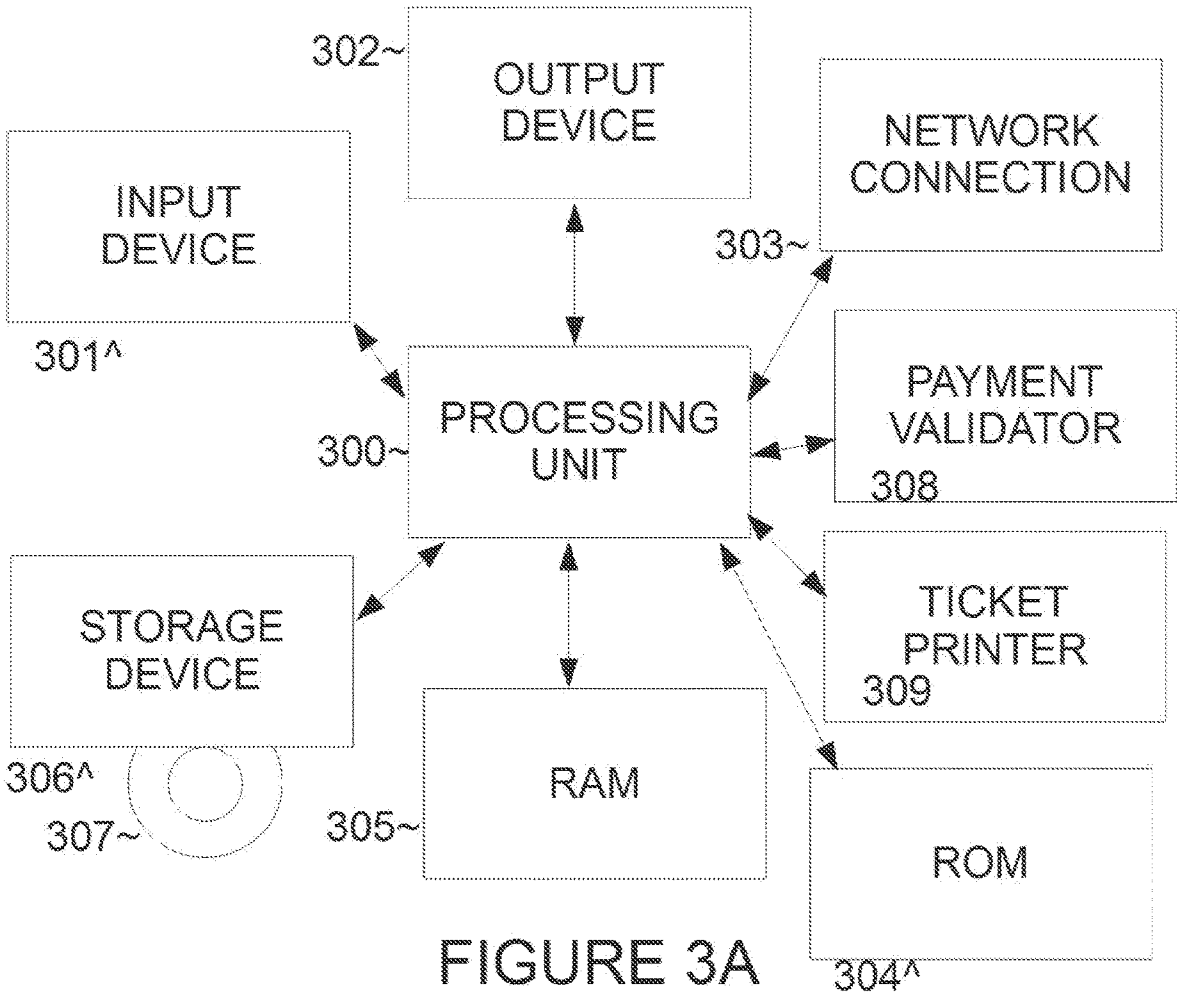
FIG. 3A is a block diagram illustrating exemplary hardware that can be used to implement the game described herein, according to an embodiment.

FIG. 3A is a block diagram illustrating exemplary hardware that can be used to implement the game described herein, according to an embodiment. The hardware in FIG. 3A can be used to implement a computer implementing the game described herein and/or a server that is serving the game to a computer which is displaying the game to a player. The game can also be played on a video slot machine (the kind that is found in physical casinos).

A processing unit 300 can be a microprocessor and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit 300 can also be connected to a network connection 303 which can connect to a computer communications network such as the Internet, Wi-Fi, LAN, WAN, etc. The processing unit 300 can also be connected to a ROM 304 and a RAM 305 as used in the art. The processing unit 300 can also be connected to a storage device 306 which can be nonvolatile storage device (e.g., BLU-RAY drive, CD-ROM drive, hard drive, EPROM, etc.) A computer readable medium 307 (e.g., BLU-RAY disc, CD-ROM, hard disc, etc.) can be read by the storage device 306 and can store programs and assets that can cause the processing unit 300 to perform any of the methods described herein. The ROM 304 and RAM 305 can also be loaded with instructions that can cause the processing unit 300 to perform any of the methods described herein.

The processing unit 300 can also be connected to a payment validator 308. The payment validator can be a bill acceptor which accepts currency, identifies it as being valid (typically by using an optical scanner), and then credits the inserted bill amount to the machine (for example inserting a $10 bill will credit the machine with $10 in credits). The bill acceptor can also accept cashless tickets as part of a 'ticket-in-ticket-out" system, in which tickets (cashless vouchers) have cash value and can be inserted into the payment validator 308. The validator 308 validates the ticket (typically be optically scanning a bar-code) and crediting the machine with the respective amount of credits. The payment validator 308 can also include a card reader which can read cards (e.g., with a magnetic stripe or other electronic encoding) so that an account number can be accessed. The cards can be a credit card, player loyalty card, specific casino payment card, or any card that can provide electronic access to a monetary amount owned by the player (owner of the card) which the player can utilize for playing the machine. If such a card is used, then the player can optionally enter (using a keypad) an amount the player wishes to withdraw from the account associated with the card to credit to the machine.

The processing unit 300 can also be connected to a ticket printer 309 which can print tickets (cashless vouchers). When the player cashes out on the machine (indicated to the machine that the player wishes to cash out and terminate by, typically by pressing a button), a ticket is printed by the ticket printer 309 which carries the amount of credits left on the machine. This ticket can then be used to play other machines in the casino by inserting them into that machine's payment validator. The ticket can also be used to redeem for cash by inserting it into a ticket redemption machine (kiosk) which receives a ticket, validates it (typically by scanning the barcode), and then dispenses an identical amount of cash to what the ticket's value is.

Figure 3B:
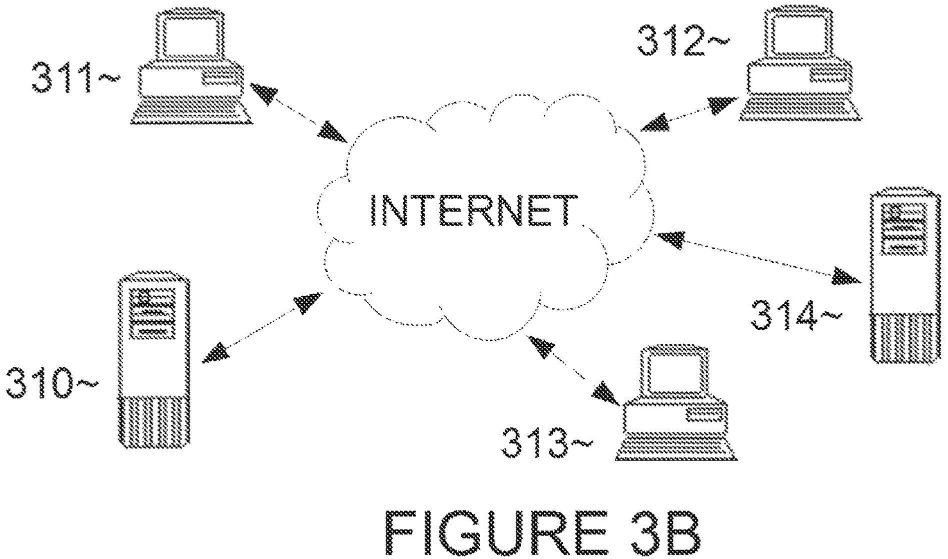
FIG. 3B is a network diagram showing a network structure for a social networking web site and players, according to an embodiment.

FIG. 3B is a network diagram showing a network structure for a social networking web site and players, according to an embodiment. The online game which awards and stores virtual points can also be accomplished by the system illustrated in FIG. 3B.

A computer communications network (such as the Internet) can be used to connect a host server 310 which can host and serve a social networking site. Note that while FIG. 3B shows only one server as the host server 310, the host server 310 can encompass numerous servers all cooperating with each other (whether in the same physical location or not). The host server 310 communicates with players 311, 312, 313 through the Internet (or other computer communication network) and can implement any of the methods herein by executing computer code programmed accordingly. Game server 314 can also implement all games and methods described herein on the site by executing computer code programmed accordingly. The game server 314 is connected to the Internet and can communicate with all of the players 311, 312, 313 directly or indirectly through the social networking site hosted by the host server 310. The game server 314 can cooperate with the host server 310 so that the games run on the game server 314 can be integrated into the social networking site hosted by the host server 310. The game server can also be optional and all of the games can be also hosted on the host server 310, whereby the integration of the games served/hosted by the game server 314 will appear embedded in the social networking site hosted by the host server 310 such that players would typically not realize (or care) that multiple servers are cooperating in order to play games on the social networking site. All of the communications described herein can be effectuated using such a network configuration. Typically, the communications are effectuated on the social networking site itself, thus the players 311, 312, 313 should be logged into the social networking site in order to participate herein, although logging in is not required (e.g., communications can be transmitted using other methods, such as email, IRC chat, instant message, etc.) The host server 310 can communicate with any of the devices illustrated in FIG. 3.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

In a further embodiment, a stud pai gow poker game can be implemented. This version can be implemented like a standard pai gow game, but at the end of the round then four cards can be utilized for a side bonus bet. This would be an alternative to burning the four remaining cards into the discard rack. Players would have an option of placing a stud bonus side bet (at the beginning of the game along with the main wager) which would pay on a pair, two pairs, a three of a kind, a straight, a flush, a four of a kind, and a straight flush, but would lose on all other hands.

Table IV is a set of exemplary rules for implementing the stud pai gow poker game.

TABLE IV

1. A single 53-card deck is used, consisting of the usual 52 cards, plus one joker.
2. The joker is semi-wild. It may be used as an ace, or to complete a straight, flush, or straight flush, or royal flush. After the player makes a bet, the dealer will deal the player and himself seven cards each.
3. Standard poker ranking rules are followed with one strange exception - the A2345 straight (known as "the wheel") is considered the second highest straight.
4. The player will separate his/her seven cards into a five-card high hand, and two-card low hand. The high hand must be of higher poker value than the low hand.
5. The five-card hand is ranked according to conventional poker rules. The only poker hand in the two-card hand is a pair or no pair, after which the individual cards determine the value.
6. After the player has set his hand, the dealer will turn over his cards and divide his hand in the same manner, according to specified rules known as the "house way."
7. The two high hands will be compared, and the two low hands, and the hand with the higher poker value (rank) wins. If the event of a tie, for example both two-card hands are ace/king, then the tie goes to the "banker" (banker/dealer win).
8. If the player wins both comparisons, then the player will win even money on his bet, less a 5% commission (or in the alternative, no commission as described herein). If the player wins one and loses one, then the bet shall push. If the player loses or ties both, then the player shall lose his/her wager.
9. The turn to act as banker ("banker" means "dealer") is supposed to rotate around the table, but at some casinos it zig-zags between the dealer and each player in turn.
10. The player may always decline to bank (which usually happens), in which case the option will revert to the next player, or deal.
11. There is a side bet call "Stud Bonus" where the players get to bet on the last remaining four cards from the deck.

Table V below is an example of a paytable for the stud pai gow poker game embodiment. Note that this paytable is merely one example, and it can be appreciated that other payouts can be used as well. Note that the player would only win the highest payout on the paytable (if more than one winning hand is applicable). Absence of any winning hand would cause the player to lose his/her stud pai gow poker bet (stud bonus bet).

TABLE V

| Hand | Payout |
|---|---|
| straight flush | 200:1 |
| four of a kind | 100:1 |
| flush | 30:1 |
| straight pays | 20:1 |
| Three of a kind | 10:1 |
| Two pairs | 5:1 |
| One pair | 3:1 |
| All others | −1 (lose) |

Figure 4:
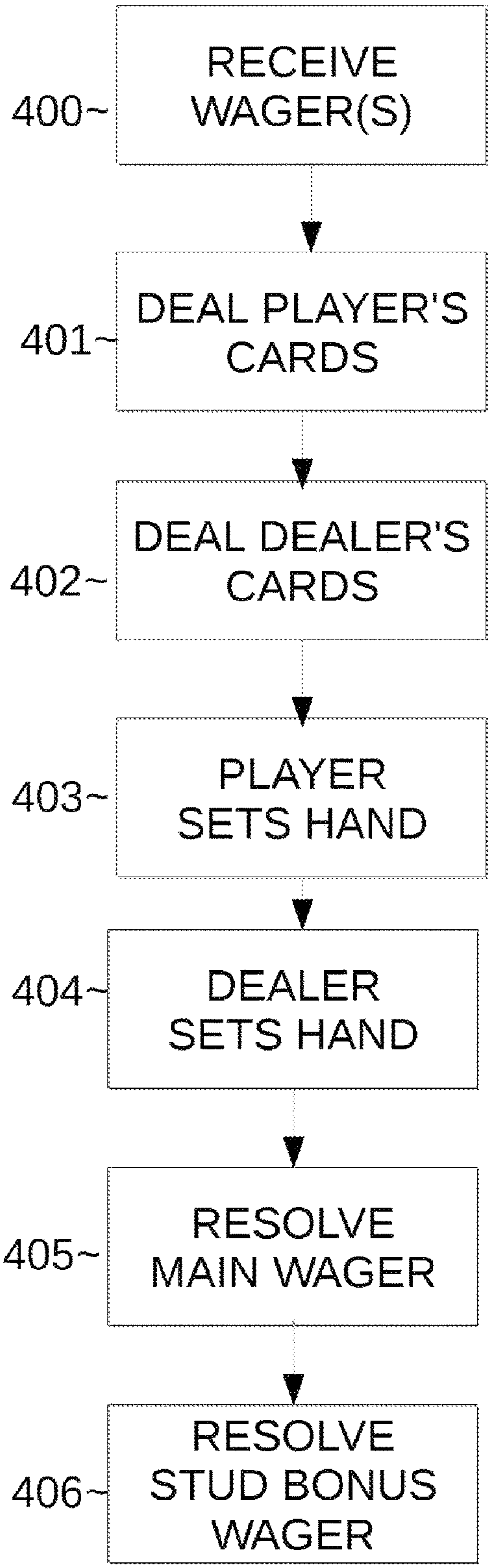
FIG. 4 is a flowchart illustrating an exemplary method of implementing a stud pai gow game, according to an embodiment.

FIG. 4 is a flowchart illustrating an exemplary method of implementing a stud pai gow game, according to an embodiment.

In operation 400, the player can make a main wager and an (optional) stud bonus wager. This can be done as described herein and known in the art.

From operation 400, the method proceeds to operation 401 which deals the player's cards. Seven cards are dealt to the player (typically face up).

From operation 401, the method proceeds to operation 402, which deals the dealer's cards. Seven cards are dealt to the dealer (face down).

From operation 402, the method proceeds to operation 403, in which the player sets his/her hand. The player will break his/her hand up into a five-card high hand and a two-card low hand.

From operation 403, the method proceeds to operation 404, in which the dealer sets the dealer's hand according to a dealer house way.

From operation 404, the method proceeds to operation 405 which resolves the main wager. This is done as known in the art and/or described herein. If the player has the higher ranked hand for both the high and the low hand, then the player wins even money on the main wager. If the dealer has the higher ranked hand for both the high and the low hand (or both dealer hand tie their respective player hand), then the player loses his/her main wager. If the player has a higher ranked hand for one of the hands and dealer has a higher ranked hand for the other of the hands, then the player's main wager pushes.

From operation 405, the method proceeds to operation 406, in which it the stud bonus wager is resolved. Four additional new cards are dealt from the deck (previously unused in the game) face up. Note that the four additional new cards could be dealt at any time after all of the player's cards (hands) and the dealer's cards (hands) have been dealt. These four cards are now used to resolve the stud bonus wager according to a paytable, for example see the paytable set forth in Table V. If the four cards comprise one of the winning hands, then the player would win the respective payout. If the four cards do not form one of the winning hands, then the player would lose the stud bonus wager. Note that all players at the table would utilize the same four cards for their stud bonus wager, so that all players would win or lose on the stud bonus wager together (although possibly in different amounts since the players may wager different amounts).

As with all of the other versions of pai gow described herein, the stud pai gow poker game can be played electronically (using a computer with virtually displayed cards) or physically (with physical cards dealt by a human dealer using physical chips in a real live physical casino with the player physically present therein). Note herein that "banker" is used synonymously with "dealer" and each can be interchanged.

Any description of a component or embodiment herein also includes hardware, software, and configurations which already exist in the prior art and may be necessary to the operation of such component(s) or embodiment(s).

Note that the electronic version of the deck uses a virtual deck which is a virtual representation of a deck (or decks) of cards and cards are selected randomly from the virtual deck to deal (display). Thus, any "shuffling" is done virtual to ensure that all cards and hands dealt are random. A standard deck has 52 cards (13 spades, 13 hearts, 13 diamonds, 13 clubs) with each suit of cards comprising ace, two, three, four, five, six, seven, eight, nine, ten, jack, queen, king. The game also uses a joker which is a $53^{rd}$ car in the deck.

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic gaming apparatus, comprising:
- an electronic output device;
- an electronic input device;
- a bill acceptor; and
- an electronic processor connected to the output device, the input device, and the bill acceptor,
- the electronic processor configured to read computer readable instructions which are programmed to, when executed, cause the electronic processor to:
  - receive a main wager and a bonus wager from a player on a pai gow game utilizing the payment validator;
  - display on the output device a random dealer's hand utilizing a virtual deck;
  - display on the output device a random player's hand utilizing the virtual deck;
- complete the pai gow game;
- resolve the main wager based on the player's hand and the dealer's hand;
- display four additional cards utilizing the virtual deck, wherein the four additional cards are dealt from the virtual deck last and were never used in the player's hand and the dealer's hand; and
- resolve the bonus wager utilizing the four additional cards.

2. An electronic gaming method, comprising:
- providing an electronic output device, an electronic input device, a bill acceptor; and an electronic processor connected to the output device, the input device, and the bill acceptor,
- executing computer readable instructions on the processor which perform:
  - receiving a main wager and a bonus wager from a player on a pai gow game;
  - displaying on the output device a random dealer's hand utilizing a virtual deck;
  - displaying on the output device a random player's hand utilizing the virtual deck;
- completing the pai gow game;
- resolving the main wager based on the player's hand and the dealer's hand;
- displaying four additional cards utilizing the virtual deck, wherein the four additional cards are dealt from the virtual deck last and were never used in the player's hand and the dealer's hand; and
- resolving the bonus wager utilizing the four additional cards.

* * * * *